United States Patent [19]
Bulger

[11] 4,185,712
[45] Jan. 29, 1980

[54] MASTER SLAVE STEERING CONTROL

[75] Inventor: Frederick J. Bulger, West Dundee, Ill.

[73] Assignee: Honeywell Inc., Minneapolis, Minn.

[21] Appl. No.: 934,106

[22] Filed: Aug. 16, 1978

[51] Int. Cl.² .................. B62D 1/26; B62D 11/20
[52] U.S. Cl. ................... 180/131; 180/9.46; 180/168; 340/53; 340/686; 404/84
[58] Field of Search .......... 180/131, 79, 98, 140, 180/9.46, 141, 142; 340/52 R, 53, 686, 679; 404/84, 98

[56] References Cited
U.S. PATENT DOCUMENTS

| | | | |
|---|---|---|---|
| 3,912,037 | 10/1975 | Krieg | 180/98 |
| 4,029,165 | 6/1977 | Miller et al. | 404/98 |
| 4,044,853 | 8/1977 | Melke | 180/98 |
| 4,140,193 | 2/1979 | Miller | 180/9.46 |

Primary Examiner—Joseph F. Peters, Jr.
Assistant Examiner—Donn McGiehan
Attorney, Agent, or Firm—Trevor B. Joike

[57] ABSTRACT

A master slave steering system is provided for earth construction machinery having front and rear steerable wheels or tracks. A front steering sensor is connected to control the front wheel or track, and the rear wheel or track is controlled either from a rear steering sensor in an automatic mode or in response to the steering of the front wheel or track in a slave mode to insure that, in the automatic mode, the front and rear wheels or tracks are rotated independently as dictated by their respective sensors and, in the slave mode, the front and rear wheels or tracks are rotated in an opposite direction with respect to one another.

26 Claims, 9 Drawing Figures

MASTER SLAVE STEERING CONTROL

BACKGROUND OF THE INVENTION

This invention relates to a control system for steering an earth construction machine and, more particularly, to a system for operating both the front and rear wheels or tracks of the machine from independent sensors in an automatic mode and for operating the front wheel or track from a sensor and the rear wheel or track dependent upon the front wheel or track in a slave mode.

In the building of today's modern highways and streets, automated machinery has been utilized to more efficiently and economically construct these roads and to reduce the wear and tear on the machine operator. A wide variety of machines have been introduced to build today's modern highways and streets. For example, graders and land levelers have been used to cut a road bed into the earth having the proper slope and depth to meet highway specifications. Once the roadbed has been prepared, the curbs and gutters are put in typically by slip-form paving machines. After the curbs and gutters are in, pavers then pave the highway or street with asphalt or concrete.

Prior to automation, the roadways were cut and the pavement was laid visually to meet the pre-established specifications. As can be seen, the manual control for the machinery was slow and placed a considerable strain on the machine operator. In order to increase efficiency, automatic controls were developed for controlling these machines in grade, slope and steering axes. A stringline is now provided as a reference for both the grade and steering axes. Specifically, a grade sensor in such systems senses the deviation between the working tool of the machine, a blade of a grader or a screed of a paver, from the stringline to adjust the proper depth of the roadbed being cut or the pavement being laid. In addition, a steering sensor is referenced from the same stringline to automatically steer the vehicle. A slope sensor, usually in the form of a pendulum, is used to control the slope of the working tool to provide the proper slope for curves and crowns of the roadbed. This automatic machinery freed the operator from the drudgery of taking an active part in the control loop and allowed him a supervisory function as overseer of system operation, increasing his efficiency and reducing his wear and tear.

Usually, but not always, these earth construction machines are driven by caterpillar tracks. When the machine is supported by only two tracks, the machine is steered by adjusting the relative speed of the two tracks. For example, one track was braked, allowing the other track to rotate the vehicle to the proper heading. Machines were also introduced having four such tracks, one at each corner of the machine. These tracks could be rotated as are automobile wheels to control the heading of the machine. Some machines have only three tracks, two on one side of the machine and one on the other side of the machine. In such cases, the two tracks on the first side of the machine are steered by rotating them as are car wheels and the third track on the opposite side of the machine is not.

Although the instant invention is useful in controlling many types of machines, it is particularly useful in controlling three track machines where the tracks on one side of the machine are steerable and the track on the other side is not. In such machines, it has been found that if, in order to steer the machine, the tracks are rotated in the same direction, for example both clockwise, the track which is not steerable is then dragged or pushed over the travelled surface thus causing it to skid. Therefore, if such a machine is making a right-hand turn and its steerable tracks are on the left side of the machine, the front track is rotated clockwise and the rear track is rotated counter-clockwise to drive the machine in a manner not to skid the third track over the ground. However, a difficulty has been observed when this type of control is performed on a hillside. If the tracks are rotated in opposite directions, one track may be driving the machine uphill and the other track may be driving the machine downhill causing a yaw in the machine as it is driven along the hillside.

SUMMARY OF THE INVENTION

In order to solve this problem, a control system is provided which has both an automatic and a slave mode of operation. In the automatic mode of operation, the front and rear propelling means, wheels or tracks, are each operated off of a separate steering sensor for independently rotating the propelling means. In the slave mode of operation, the front propelling means is rotated from a front steering sensor and the rear propelling means is slaved to the front propelling means so that they both turn in opposite directions. Thus, on a hillside the automatic steering control is used so that both the front and the rear of the machine are positively driven to or away from the steering reference and on a flat surface the slave mode of operation can be undertaken so that the front and rear propelling means are turned in opposite directions for normal steering.

BRIEF DESCRIPTION OF THE DRAWINGS

These and other features and advantages will become apparent from a detailed consideration of the invention when taken in conjunction with the drawings in which.

DETAILED DESCRIPTION OF THE INVENTION

Figure 1:
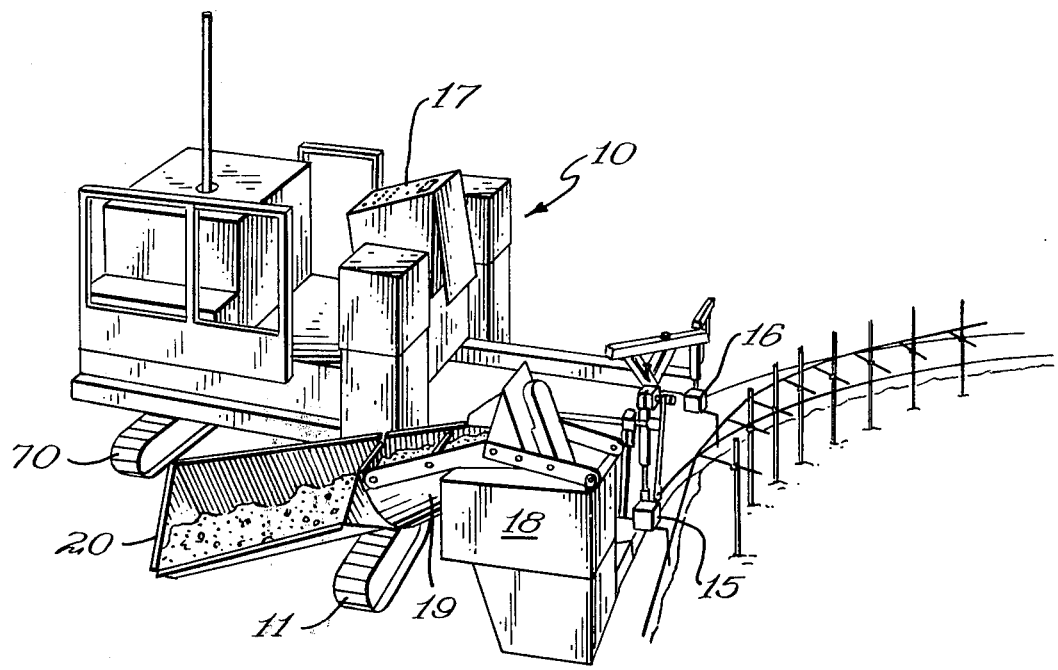
FIGS. 1 and 1A are views of a machine on which the present control system can be used.
Figure 1A:
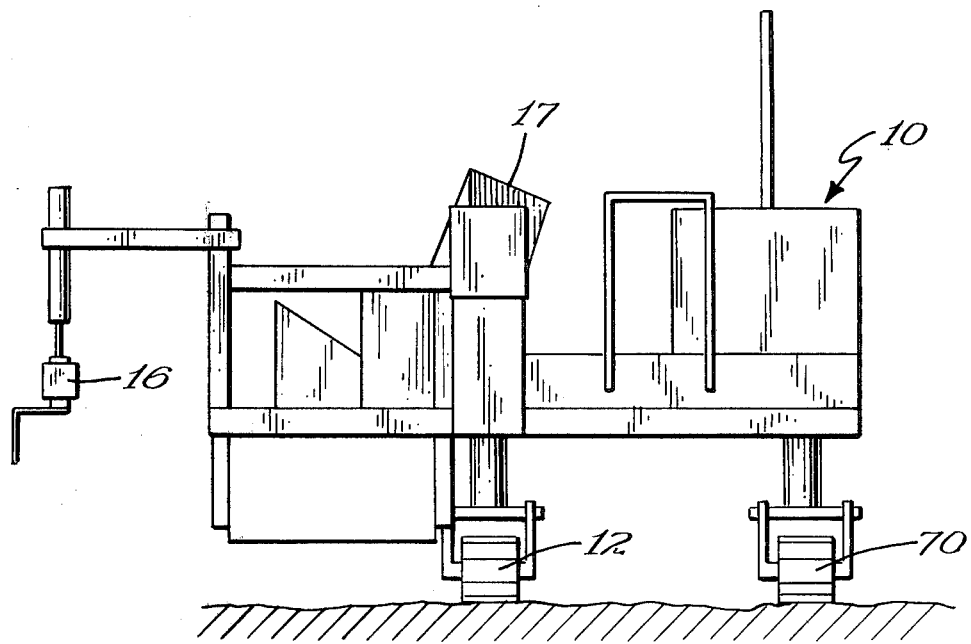

In FIGS. 1 and 1A, machine 10 has front and rear steerable tracks 11 and 12 on one side of the machine and another track 70 on the opposite side of the machine. Tracks 11 and 12 are steerable and can be rotated about their vertical axes to steer the vehicle, and track 70 is not steerable. Front and rear stringline followers or steering sensors 15 and 16 are shown and are used to control the steering of their respective front and rear tracks 11 and 12. Machine 10 is a slip-form paving machine, as can be seen, having a control console 17, concrete receiving hopper 18 which receives concrete from chute 19 which drives the concrete into hopper 18 from concrete receiver 20. Receiver 20 is supplied with concrete from a truck not shown. A slip form behind hopper 18 then smoothes the concrete into proper shape.

Figure 2:
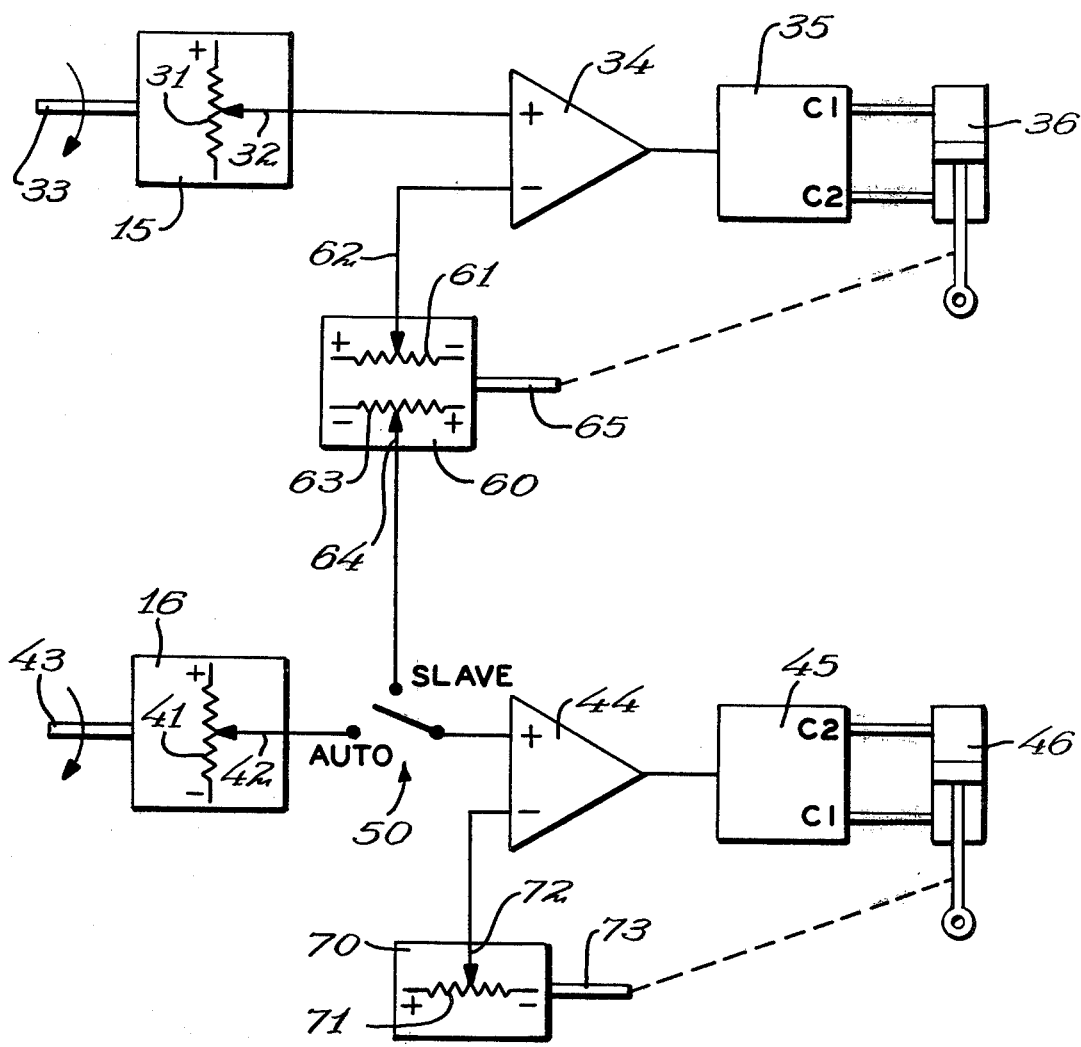
FIG. 2 is a circuit diagram for the control system of the invention.
Figure 8:
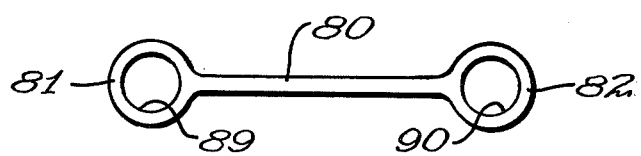
FIG. 8 shows the bar 80 shown in FIG. 5 but detached from the machine.
Figure 3:
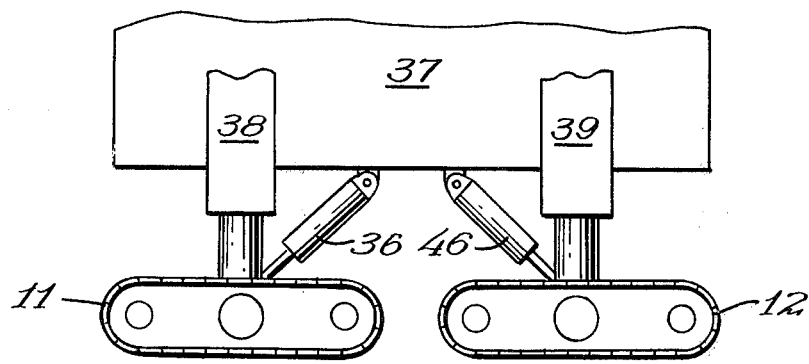
FIG. 3 shows a side view of the machine and how the steering cylinders may be mounted between the machine and the tracks which are rotated.
Figure 4:
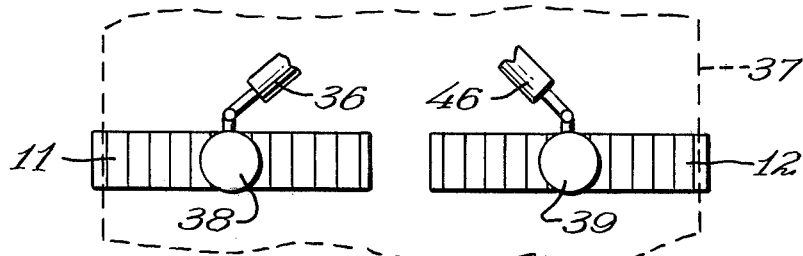
FIG. 4 is a top view of the steering cylinders shown in FIG. 3.

As shown in FIG. 2, front steer sensor 15 has a potentiometer 31 which is connected to a source potential as shown and a wiper arm 32 driven by the stringline follower 33. Wiper arm 32 is connected to the positive input terminal of amplifier 34 the output of which is connected to the electrical input of valve 35. Valve 35 may be the Honeywell V7059 and has its output ports connected to steering cylinder 36 as shown. As shown in FIG. 3, steering cylinder 36 for the front propelling means or track 11 is connected between the machine and the track and must have a long enough stroke to accommodate the machine body 37 being raised and lowered by rams or cylinders 38 and 39. As cylinder 36 is extended, track 11 is rotated in a counter-clockwise direction.

Likewise, potentiometer 41 of rear steering sensor 16 is connected between a positive and negative source as shown and has a wiper arm 42 driven by the stringline follower 43. Wiper arm 42 is connected to the AUTO terminal of switch 50 having its movable contact connected to the positive input of amplifier 44 the output of which is connected to valve 45. Valve 45 may be of the same type as valve 35 but has its output ports connected in an opposite configuration to the rear steering cylinder 46. As cylinder 46 extends, track 12 is rotated in a clockwise direction.

When switch 50 is in its automatic position, a deviation of the front and rear of the machine by an equal amount from the stringline will cause the outputs of amplifiers 34 and 44 to be in the same direction and by the same amount but because valves 35 and 45 are connected to the respective cylinders 36 and 46 in the opposite sense, one cylinder will contract and the other cylinder will expand causing the tracks 11 and 12 to move or rotate in the same direction. Thus, when the machine is being operated on a hillside and both its front and back slip downhill from the stringline, located on the left side of the machine, by an equal amount, front track 11 and rear track 12 will both be rotated in a counter-clockwise direction to drive the front and rear of the machine both back to the stringline.

The system in FIG. 2 additionally provides a feedback transducer 60 which has mounted therein a potentiometer 61 having a wiper arm 62 and a potentiometer 63 having a wiper arm 64. Wiper arms 62 and 64 are driven in the same direction by input shaft 65 but they have their resistance portions connected to oppositely connected sources. Wiper arm 62 is connected to the negative input of amplifier 34 and wiper arm 64 is connected to the SLAVE terminal of switch 50.

Figure 5:
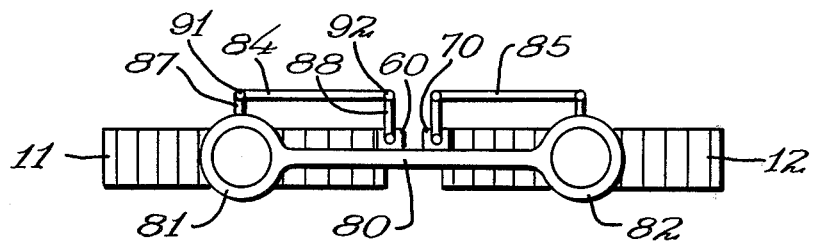
FIG. 5 shows how the feedback transducers shown in FIG. 2 can be operated when the tracks of the machine are rotated.
Figure 6:
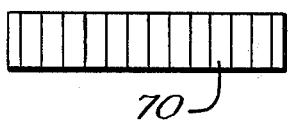
FIG. 6 shows the tracks rotated in an opposite direction.
Figure 6:
Figure 6:
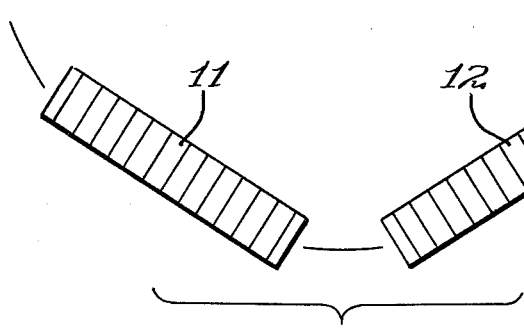
Figure 7:
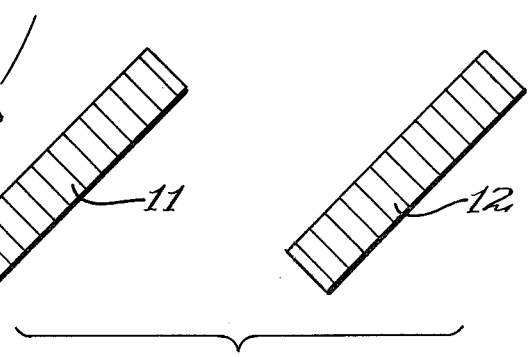
FIG. 7 shows the tracks rotated in the same direction.

A second feedback transducer 70 has a resistance portion 71 and a wiper arm 72 connected as shown. Wiper arm 72 is positioned by shaft 73 and is connected to the negative input terminal of amplifier 44. As has been mentioned above, the machine is operated in the automatic mode when on a hillside. Thus, a deviation of the front and back of the machine from the stringline or toward the stringline in the same direction and by the same amount will result in a change in the electrical signal on both wiper arms 32 and 42 in the same direction by the same amount to result in the rotation of tracks 11 and 12 in the same direction. However, on the flat, it is desirable to rotate tracks 11 and 12 in opposite directions so that the third track will not be dragged or skidded over the ground. Thus, if the front of the machine deviates from the stringline in a direction to cause a positive change in the signal on wiper arm 32, cylinder 36 is extended to change wiper arm 62 in a positive direction to balance the electrical signal to the positive input of amplifier 34. However, when wiper arm 62 is driven in a direction to cause a positive change of the voltage on it, wiper arm 64 is caused to change in the same direction but resulting in a negative voltage change on it. Thus, this negative voltage change to the positive input of amplifier 44 will cause cylinder 46 to also extend rotating track 12 in a direction opposite to track 11 as shown in FIG. 6. Therefore, the machine is turned so that track 70 is neither dragged nor pushed to skid over the ground. When ram 46 extends, it drives wiper arm 72 in a negative going direction to balance out the negative going signal to the positive input of amplifier 44. This can be seen from FIG. 5 which shows the way in which feedback transducers 60 and 70 are mounted to the machine. Bar 80 having an opening 89 at end 81 through which the lower portion of ram 38 may extend and an opening 90 at end 82 through which the lower end of ram 39 can extend is mounted so that tracks 11 and 12 can be rotated in either direction without affecting the bar 80. Moreover, the height of the machine 37 with respect to tracks 11 and 12 will not affect the bar 80. Transducer 60 is mounted to bar 80 and through a crank arm arrangement 84 will rotate wiper arms 62 and 63 as front track 11 is rotated. Transducer 70 is connected through a crank arm 85 to track 12 so that as track 12 rotates wiper arm 72 will rotate. Transducers 60 and 70 may be SB103's produced by Honeywell. For example, crank arm 84 has a portion 87 rigidly attached to track 11 and a portion 88 rigidly attached to the wiper arm of feedback transducer 60. Junctions 91 and 92 are pivotable. Thus, as track 11 is rotated in a clockwise direction, portion 87 is rotated in a clockwise direction to push back on portion 88 to appropriately adjust wiper arms 62 and 64 of feedback transducer 60. Feedback transducer is similarly operated by crank arm 85 when rear track 12 operates.

OPERATION

With switch 50 in the auto position, and with the stringline on the left side of the machine, if the front and back of the machine slip away from the stringline by the same amount, the signal on wiper arm 32 and the signal on wiper arm 42 both increase in a positive direction resulting in an increase in the signal from both amplifiers 34 and 44. An increase in the signal to valve 35 results in more fluid flowing from port C1 extending cylinder 36 to move track 11 in a counter-clockwise direction. When track 11 turns in a counter-clockwise direction, crank arm 88 is rotated in a counter-clockwise direction to move wiper arm 62 more towards the positive terminal. Thus, the positive going change to the plus input terminal of amplifier 34 is balanced by a positive change to the negative input terminal of that amplifier. At the same time, a positive going input to valve 45 increases the flow from output port C1 which contracts cylinder 46 for rotating track 12 in a counter-clockwise direction. When track 12 rotates in a counter-clockwise direction, the crank portion connecting crank arm 85 to feedback potentiometer 70 moves in a counter-clockwise direction for moving wiper arm 72 towards the positive terminal of resistance 71. Thus, the positive going input to positive terminal amplifier 44 is balanced by a positive going signal to the negative input of that amplifier. Thus, both tracks 11 and 12 are rotated in a counter clockwise direction to move machine 37 back towards the stringline.

With switch 50 in the slave position and machine 37 on the right side of the stringline, if the front and rear of the machine simultaneously slip the same distance away from the stringline, wiper arm 32 moves in a direction to produce a positive going change of the voltage connected to the positive input terminal of amplifier 34 resulting in a positive going change in the output signal from amplifier 34. This positive going change to the input of valve 35 increases the output flow from output port C1 to extend cylinder 36. When cylinder 36 extends, track 11 is moved in a counter-clockwise direction which rotates crank arm portion 88 of crank arm 84 in a counter-clockwise direction to move potentiometer 62 towards its positive terminal of resistance 61 and wiper arm 64 towards the negative terminal of resistance 63. Thus, the positive going change to the positive input terminal of 34 is balanced by a positive going change to the negative input terminal of that amplifier. However, a negative going change on wiper arm 64 results in a negative going change from the output of amplifier 44 to increase the flow from output port C2 for extending cylinder 46. When cylinder 46 extends, track 12 rotates in a clockwise direction which results in a clockwise rotation of the crank arm portion connecting crank arm 85 to feedback potentiometer 70 resulting in a negative going travel of wiper-arm 72. Thus, the negative going change to the positive input of amplifier 44 is balanced by a negative going change to the negative input of that amplifier. The machine turns and is driven back to the stringline.

The embodiments of the invention in which an exclusive property or right is defined as follows:

1. A steering control system for an earth construction machine having front and rear steerable propelling means capable of being controlled in either of two modes, each rotated independently or both rotated in opposite rotational directions, said system comprising:
    front steering sensor means responsive to a steering reference;
    first control means adapted to control the steering of said front steerable propelling means;
    connecting means for connecting said front steering sensor means to said first control means;
    first feedback means adapted to be responsive to the steering of said front steerable propelling means for providing a feedback signal to said first connecting means;
    rear steering sensor means responsive to said steering reference;
    second control means adapted to control the steering of said rear steerable propelling means;
    switching means for alternatively connecting said rear steering sensor means and said first feedback means to said second control means for operating both said front and back steerable propelling means in one of said modes when said second control means is connected to said rear steering sensor means and in the other of said modes when said second control means is connected to said first feedback means; and,
    second feedback means adapted to be responsive to the steering of said rear steerable propelling means for providing a feedback signal to said switching means.

2. The system of claim 1 wherein said connecting means comprises an amplifier means having an input connected to said front steering system means and an output connected to said first control means.

3. The system of claim 2 wherein said amplifier means comprises an amplifier having a positive input connected to said front steering sensor means, a negative input connected to said first feedback means and an output connected to said first control means.

4. The system of claim 3 wherein said first feedback means comprises a first potentiometer having a first resistance portion and a first wiper arm, said first wiper arm being connected to said negative terminal of said amplifier and adapted to be driven by said front steerable propelling means.

5. The system of claim 4 wherein said switching means comprises an amplifier means having an input connected to said rear steering sensor means and an output connected to said second control means.

6. The system of claim 5 wherein said amplifier means of said switching means comprises an amplifier having a positive input connected to said rear steering sensor means, a negative input connected to said second feedback means and an output connected to said second control means.

7. The system of claim 6 wherein said second feedback means comprises a second potentiometer having a second resistance portion and a second wiper arm, said second wiper arm connected to said negative terminal of said amplifier means of said switching means and adapted to be driven by said rear steerable propelling means.

8. The system of claim 7 wherein said first feedback means comprises a third potentiometer having a third resistance portion and a third wiper arm adapted to be driven by said front steerable propelling means, said first and third resistance portions are arranged such that rotation in one direction of said front steerable propelling means produces opposite going signals on said first and third wiper arms.

9. The system of claim 8 wherein said switching means comprises a switch having a first terminal connected to said rear steerable sensor means, a second terminal connected to said third wiper arm and a contact movable between said first and second terminals and connected to said positive input of said amplifier of said switching means.

10. The system of claim 1 wherein said switching means comprises an amplifier means having a positive input terminal connected to said rear steering sensor means, a negative input terminal connected to said second feedback means and an output terminal connected to said second control means.

11. The system of claim 10 wherein said second feedback means comprises a first potentiometer having a first resistance portion and a first wiper arm, said first wiper arm connected to said negative input terminal of said amplifier of said switching means and adapted to be driven by said rear steerable propelling means.

12. The system of claim 11 wherein said first feedback means comprises a second potentiometer having a second resistance portion and a second wiper arm adapted to be driven by said front steerable propelling means and connected to said switching means.

13. The system of claim 12 wherein said switching means further comprises a switch having a first terminal connected to said rear steering sensor means, a second terminal connected to said second wiper arm and a contact movable between said first and second terminals and connected to said positive input terminal of said amplifier means of said switching means.

14. A steering control system for an earth construction machine having front and rear steerable propelling means capable of being controlled in either of two modes, each rotated independently or both rotated in opposite rotational directions, said system comprising:
front and rear steering sensor means both responsive to a steering reference;
first means responsive to said front steering sensor means and adapted to control the steering of said front steerable propelling means;
slave means adapted to be responsive to the steering of said front steerable propelling means;
second means selectively responsive to said rear sensor means and to said slave means and adapted to operate said front and rear steerable propelling means in one of said modes when responsive to said rear steering sensor means and in the other of said modes when responsive to said slave means.

15. The system of claim 14 wherein said first means comprises an amplifier means having an input connected to said front steering sensor means and an output means adapted to control said front steerable propelling means.

16. The system of claim 15 wherein said amplifier means comprises an amplifier, having a positive input connected to said front steering sensor means and a negative input, and first feedback means responsive to said front steerable propelling means and connected to said negative input.

17. The system of claim 16 wherein said first feedback means comprises a first potentiometer having a first resistance portion and a first wiper arm, said first wiper arm being connected to said negative terminal of said amplifier and adapted to be driven by said front steerable propelling means.

18. The system of claim 17 wherein said second means comprises an amplifier means having an input connected to said rear steering sensor means and an output means adapted to control said rear steerable propelling means.

19. The system of claim 18 wherein said amplifier means of said second means comprises an amplifier having a positive input connected to said rear steering sensor means and a negative input, and second feedback means responsive to said rear steerable propelling means and connected to said negative input of said amplifier of said second means.

20. The system of claim 19 wherein said second feedback means comprises a second potentiometer having a second resistance portion and a second wiper arm, said second wiper arm connected to said negative terminal of said amplifier of said second means and adapted to be driven by said rear steerable propelling means.

21. The system of claim 20 wherein said first feedback means comprises a third potentiometer having a third resistance portion and a third wiper arm adapted to be driven by said front steerable propelling means, said first and third resistance portions connected such that rotation in one direction of said front steerable propelling means produces opposite going signals on said first and second wiper arms.

22. The system of claim 21 wherein said second means comprises a switch having a first terminal connected to said rear steerable sensor means, a second terminal connected to said third wiper arm and a contact movable between said first and second terminal and connected to said positive input of said amplifier of said second means.

23. The system of claim 14 wherein said second means comprises an amplifier means having a positive input terminal connected to said rear steering sensor means and a negative input terminal, and first feedback means responsive to said rear steerable propelling means and connected to said negative input terminal.

24. The system of claim 23 wherein said first feedback means comprises a first potentiometer having a first resistance portion and a first wiper arm, said first wiper arm connected to said negative input terminal and adapted to be driven by said rear steerable propelling means.

25. The system of claim 24 wherein said first means comprises a second potentiometer having a second resistance portion and a second wiper arm adapted to be driven by said front steerable propelling means and connected to said second means.

26. The system of claim 25 wherein said second means further comprises a switch having a first terminal connected to said rear steering sensor means, a second terminal connected to said second wiper arm and a contact movable between said first and second terminals and connected to said positive input terminal of said amplifier of said second means.

* * * * *